June 5, 1945. R. H. JOHNSTON 2,377,559
GEARING FOR STEERING MECHANICALLY PROPELLED
VEHICLES AND FOR OTHER PURPOSES
Filed July 12, 1943
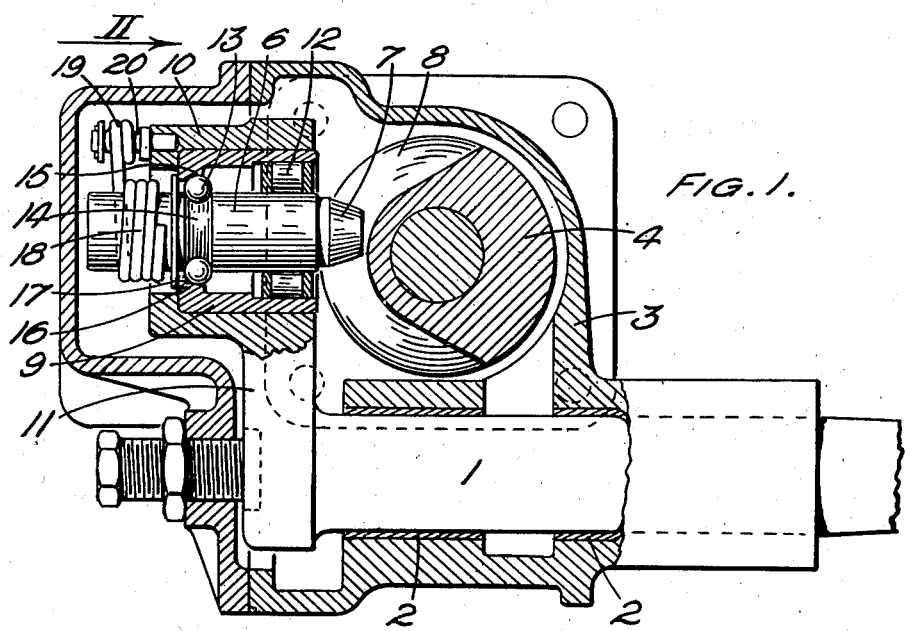
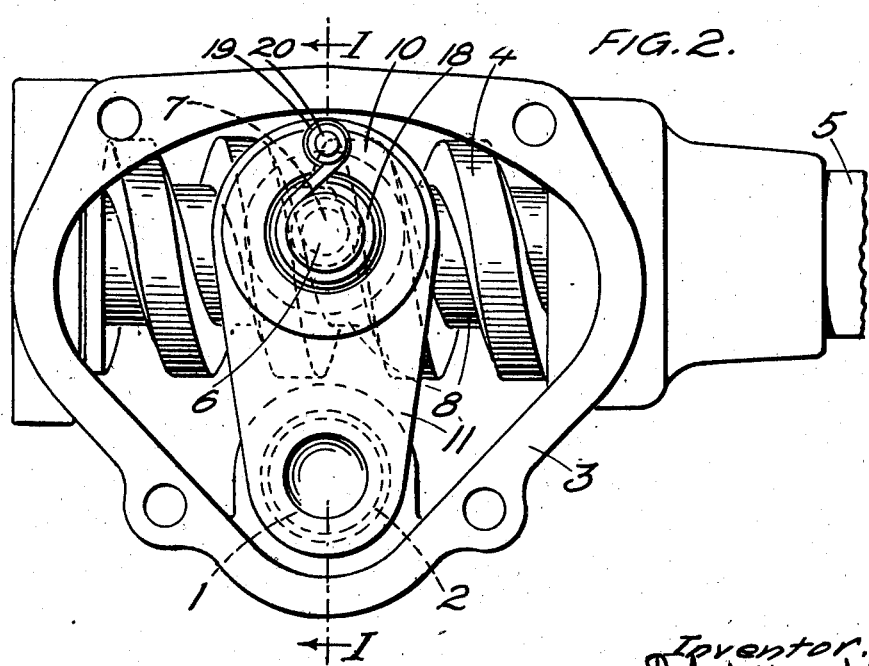

Patented June 5, 1945

2,377,559

UNITED STATES PATENT OFFICE 2,377,559

GEARING FOR STEERING MECHANICALLY PROPELLED VEHICLES AND FOR OTHER PURPOSES

Robert Henry Johnston, Harpenden, England

Application July 12, 1943, Serial No. 494,390
In Great Britain February 16, 1943

3 Claims. (Cl. 74—500)

This invention relates to gearing that is particularly, although not exclusively, applicable to the steering of mechanically propelled road vehicles. The invention may be applied with great advantage to gearing of the kind (hereinafter referred to as of the kind specified) comprising a cam which is engaged by a follower mounted on or operatively connected to a rocker-arm which is mounted on a rocker-shaft and is angularly movable parallel to the side of the cam. Gearing of the kind specified is described, for instance, in the specifications Nos. 1,673,488, 1,899,663 and 1,995,239. Other forms of gearing may also have the invention applied thereto, however, with advantage.

When gearing of the nature indicated is constructed to have a high or relatively high efficiency it is found that any shocks to which the controlled apparatus, for example, the steerable road wheels of a vehicle, may be subjected are transmitted to the controlling member, for example, the steering wheel of the vehicle, to an unpleasant degree. In addition, the effort required of the driver (in the specilc example of steering a vehicle) in order to hold the steerable road wheels at a desired angular setting against the returning force due to the "caster eeffct" is comparatively high. It will be seen, therefore, that the improvement in the efficiency of the gearing has been accompanied by other unexpected disadvantages.

Now it is the main object of the present invention to provide gearing which shall be free from these disadvantages while still affording the high efficiency usually required in practice.

Another object of the invention is to provide gearing, particularly gearing for the steering of mechanically propelled road vehicles, adapted to operate at a lower efficiency in transmitting movement from the controlled apparatus to the controlling member than that at which it operates in transmitting movement from the controlling member to the controlled apparatus.

A further object is to provide gearing of the kind specified comprising means for automatically reducing the efficiency at which it operates as soon as the controlled apparatus tends to drive the controlling member.

Yet another object is to provide gearing according to either of the two preceding paragraphs, comprising an element which moves in one direction during the normal operation of the gearing from the controlling member and tends to move in the opposite direction during the operation of the gearing from the controlled apparatus and means which automatically arrests or retards the said element when it tends to move in said opposite direction. The arrest or retardation of the element preferably results in an immediate increase in the frictional losses in the gearing, with a consequent reduction in the efficiency thereof as is desired. In gearing of the kind specified the said element may with advantage be the follower itself, this being constituted for this purpose of a pin rotatably mounted in antifriction bearings in the rocker-arm.

One form of gear according to the present invention and applicable, for example, to the steering of a mechanically propelled road vehicle will now be described by way of example and with reference to the accompanying drawing, wherein:

Fig. 1 is a part section on the line I—I of Fig. 2, and

Fig. 2 is a view of the gearing with the cover plate removed and in the direction of the arrow II of Fig. 1.

The rocker shaft 1 is mounted in bearings 2, 2 in a casing 3. The worm cam 4 is mounted on its operating shaft, for example on the lower end of the steering wheel column 5 of the motor vehicle. The thread of the worm may be produced in the manner described in the specification No. 1,673,488.

The follower itself is a cylindrical pin 6 with a frusto-conical end 7 engaging in the cam groove 8. This pin 6 is mounted in bearings in a bush 9 received in an outwardly projecting boss or enlargement 10 which is formed near the free end of the rocker arm 11. The bearings comprise a plain roller bearing 12 located near the conical inner end of the pin in a slight enlargement of the bore of the bush and a thrust ball bearing 13 located near the other or outer end of the pin and having its balls running, on the one hand, in an annular groove 14 in the pin and, on the other hand, in a groove 15 in the inner corner of an inturned flange 16 at the outer end of the bush. The pin is further located by a spring ring 17 engaging in a groove in the pin and engageable against the outer side of the flange on the bush.

With such an arrangement it is found that the follower-pin 6 always rotates in the one direction, say anti-clockwise, when the gearing is actuated from the controlling member, for example the steering column 5 of a motor vehicle, irrespective of the direction in which the cam is rotated by the latter. Similarly, the follower-pin always tends to rotate in the opposite direction (clockwise) when an attempt is made to actuate the gearing from the controlled apparatus, for example the steerable road wheels of the said vehicle. In accordance with the invention, therefore, clutch means is provided for automatically preventing the rotation of the follower-pin in the said opposite or clockwise direction with the result that it then works in sliding contact with the cam and not in rolling contact therewith. Suitable means comprises a helical spring wire 18 of a few turns placed over the follower-pin 6 and having one end 19 extended and anchored. In the example shown the end 19 is attached to a pin 20 which is secured by screwing or welding to the enlargement 10 at the outer end of the rocker arm 11. The helical spring engages the surface of the follower-pin 6 so that in one direction the latter can rotate freely. If the follower-pin tends to rotate in the other direction the helical spring immediately tightens and grips and locks it against rotation.

What I claim is:

1. Transmission gearing operative between a controlling member and a controlled apparatus and comprising a cam and a follower engaged with and relatively traversable with respect to each other, said follower being a pin which is rotatable on its axis as well as traversable with respect to said cam, and clutch means operative to retard rotation of said pin when the gearing is operated to transmit movement from said controlled apparatus to said controlling member.

2. Gearing according to claim 1, wherein the clutch means comprises a helical spring placed closely about the pin and having one end anchored with respect to said pin.

3. In steering apparatus for a mechanically propelled road vehicle and in combination, a steering column, a rotary cam to be operated by said column, a follower pin engaged with said cam, a rocker arm having said follower pin rotatably mounted thereon, a rocker shaft carrying said rocker arm and enabling the latter to be angularly movable in a plane parallel to the axis of said cam, and a helical spring placed closely about said follower pin and having one end anchored to said rocker arm.

ROBERT HENRY JOHNSTON.